(12) United States Patent
Li et al.

(10) Patent No.: US 12,094,079 B2
(45) Date of Patent: Sep. 17, 2024

(54) REFERENCE-BASED SUPER-RESOLUTION FOR IMAGE AND VIDEO ENHANCEMENT

(71) Applicant: Apple Inc., Cupertino, CA (US)

(72) Inventors: Feng Li, Fremont, CA (US); Jia Xue, Cupertino, CA (US); Saeed Izadi, Coquitlam (CA)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 17/658,706

(22) Filed: Apr. 11, 2022

(65) Prior Publication Data

US 2023/0098437 A1 Mar. 30, 2023

Related U.S. Application Data

(60) Provisional application No. 63/261,626, filed on Sep. 24, 2021.

(51) Int. Cl.
*G06T 3/40* (2024.01)
*G06T 3/4046* (2024.01)
*G06T 7/30* (2017.01)

(52) U.S. Cl.
CPC .............. *G06T 3/4046* (2013.01); *G06T 7/30* (2017.01); *G06T 2207/20212* (2013.01)

(58) Field of Classification Search
CPC ............ G06T 7/74; G06T 2207/20081; G06T 2207/20084; G06T 2207/30244; G06N 3/08
See application file for complete search history.

(56) References Cited

U.S. PATENT DOCUMENTS

| | | |
|---|---|---|
| 2020/0226771 A1 | 7/2020 | Kaufman |
| 2021/0004933 A1 | 1/2021 | Wong |
| 2021/0225034 A1 | 7/2021 | Citraro |
| 2021/0256299 A1 | 8/2021 | Jason |
| 2021/0272275 A1* | 9/2021 | S. ............................ G16H 30/40 |
| 2022/0299588 A1* | 9/2022 | Zhu ..................... G01R 33/5611 |

* cited by examiner

*Primary Examiner* — Quang N Vo
(74) *Attorney, Agent, or Firm* — Blank Rome LLP

(57) ABSTRACT

Devices, methods, and computer readable media to provide enhanced images in multi-camera systems, e.g., by using images captured by cameras with different optical properties and/or sensors. In one embodiment, the techniques comprise reference-based image super-resolution techniques for producing, with a first neural network employing robust feature aggregation techniques (e.g., techniques able to blend between single-image enhancement and feature aggregation, when appropriate), an enhanced output image that attempts to match the quality characteristics of each of region in a lower quality (e.g., shorter focal length, larger field of view (FOV)) input image with the quality characteristics of the region's determined guidance region from at least a second, i.e., higher quality (e.g., longer focal length, smaller FOV image) input image. The guidance regions from the higher quality image that are determined for each region from the lower quality input image may be determined by performing homographic mapping and/or semantic feature matching techniques.

20 Claims, 9 Drawing Sheets

REFERENCE-BASED SUPER-RESOLUTION FOR IMAGE AND VIDEO ENHANCEMENT

TECHNICAL FIELD

This disclosure relates generally to the field of digital image processing, More particularly, but not by way of limitation, it relates to techniques for achieving a high quality seamless appearance in enhanced images formed from images captured using two or more different image capture devices.

BACKGROUND

The advent of mobile, multi-function devices, such as smartphones and tablet devices, has resulted in a desire for small form factor cameras capable of generating high levels of image quality in near-real time for integration into such mobile, multi-function devices. Increasingly, as users rely on these multi-function devices as their primary cameras for day-to-day use, they demand features and image quality levels that they have become accustomed to from the use of dedicated-purpose camera devices.

Some camera devices may comprise two or more image capture devices, e.g., in order to produce images having increased quality, field of view (FOV), depth information, etc., i.e., over what a camera device having a single image capture device may be able to produce. For example, stereo image capture systems may consist of two or more image capture devices pointed at the same scene, but that capture the scene from different viewpoints or with cameras that have different properties. In such a system, each image capture device may be chosen to have specific intrinsic properties, e.g., focal length, resolution, color sensitivity, etc., as well as specific extrinsic properties, such as orientation and position. In particular, by choosing complimentary intrinsic and extrinsic properties for the multiple image capture devices in a given image capture system, it may be possible to produce images of increased quality by intelligently combining the information captured by each image capture device.

In some such multi-camera image capture systems, the information from the various images captured by the two or more image capture devices may be combined, e.g., via a process known as "image stitching" or "image fusion." By stitching together the images captured by the different image capture devices in a multi-camera image capture system, enhanced images may be generated that inherit the individual strengths of the various image capture devices in the image capture system, e.g., certain image capture devices may have a larger field of view (FOV), while other image capture devices may have better imaging quality at certain portions of the captured scene, etc. Stereo image stitching has applications in many areas, including image/video composition and video stabilization, which can utilize the increased FOV that is achievable from performing stereo image stitching. As used herein, "stitching" or "fusion" may refer to a process that extends the FOV of one or more of the individual source images or a process that generates an enhanced image with the same FOV as one or more of the source images.

However, the image stitching and/or fusion processes can be quite challenging, particularly due to the parallax phenomenon, i.e., the apparent change in position of an object when viewed from different camera viewpoints. E.g., objects closer to the image capture system exhibit more parallax (i.e. greater displacement relative to the position of the object as viewed from the other viewpoint) than those objects that are farther away from the image capture system. Because of this property, parallax may be used as a proxy for depth estimates of objects in the scene. However, parallax can also cause severe artifacts in image stitching and fusion processes, such as occlusion. Occlusion occurs where an object is visible from the viewpoint of one camera in the image capture system, but is not visible (e.g., due to being blocked by some other object) from the viewpoint of another camera in the image capture system. In cases of occlusion, for a given pixel from an image captured from a first viewpoint, there may be no "corresponding" pixel in an image taken from another viewpoint, and thus no other pixel's information with which to combine or enhance the given pixel's information. Additionally, as mentioned above, different cameras within an image capture system can have different intrinsic properties, e.g., different fields of view, depth of field, spatial resolution, color sensitivity, and/or image signal processor (ISP) tuning, which can further complicate the process of stitching together images from such disparate cameras without introducing noticeable artifacts or seams caused by different properties of cameras.

As some small form factor (e.g., smartphone) device cameras move to having longer and longer focal lengths (e.g., 50 mm or longer), it becomes more and ore challenging to match the image quality of a digitally-zoomed image, e.g., an image captured by a wide angle camera of a smartphone (also referred to herein as a "Wide" camera or "SuperWide" camera) to the image quality of an image captured by a telephoto camera of the smartphone (also referred to herein as a "Tele" camera). For example, in the case where an image captured by a Wide camera (defined, in this example, as having 1.0× optical zoom) is digitally zoomed to a factor of 4.9× before the smart phone switches over to using the Tele camera (defined, in this example, as having 5.0× optical zoom), there will be a large quality gap between the images captured by the Wide camera and the images captured by the Tele camera. Users may thus experience a gradual image quality drop while digitally zooming the Wide camera from 1.0× to 4.9× zoom, and then see a significant quality improvement when the Tele camera replaces the Wide camera at 5.0× optical zoom.

Existing so-called Single Image Super-Resolution (SISR) methods can generate better digitally zoomed images than conventional interpolation-based methods, such as bi-cubic interpolation and directional filtering based up-scaling. For example, the upscaled images generated by SISR methods usually have sharper details, less aliasing, less halo artifacts, less ringing, and less noise. However, it is still very challenging to generate realistic high-quality textures using SISR techniques—especially when the lower resolution, i.e., blurrier, input image does not provide sufficient discriminative information. In such cases, SISR fails to hallucinate realistic-looking higher quality textures.

Thus, presented herein is a so-called Reference-based Image Super-Resolution (or "RefSR") image processing system to mitigate these issues and significantly improve image quality for digitally-zoomed images and videos. In particular, RefSR techniques may help to better regularize a highly ill-posed problem of image texture and detail enhancement with additional constraints from so-called "guidance regions" coming from an at least partially-overlapping additional higher quality guidance image of the same captured scene. The RefSR techniques disclosed herein may thus be able to bridge the gap in the perceptual quality between input images captured by image capture devices having different quality characteristics, e.g., in terms of matching spatial resolution, sharpness, texture details, and noise patterns, and achieve high quality seamless appearance in enhanced output images formed from input images captured using two or more different image capture devices.

SUMMARY

Devices, methods, and non-transitory computer readable media are disclosed herein to provide enhanced images in multi-camera systems, e.g., by using images captured by cameras with different optical properties and or sensors. In one embodiment, the techniques comprise reference-based image super-resolution (i.e., "RefSR") techniques for obtaining multiple input images with different properties and producing, with a first neural network employing robust feature aggregation techniques (e.g., techniques that are able to blend between using feature aggregation and single-image enhancement methods on portions of the input images, where appropriate), an enhanced output image that attempts to match the quality characteristics of each of region in a lower quality (e.g., shorter focal length, larger field of view (FOV)) input image with the quality characteristics of the region's determined guidance region from at least a second, i.e., higher quality (e.g., a longer focal length, smaller FOV image, but with similar or higher pixel count) input image. The guidance regions from the higher quality image that are determined for each region from the lower quality input image may be determined by performing homographic mapping and/or semantic feature matching techniques.

In one embodiment, the techniques comprise: obtaining a first image from a first image capture device of an electronic device, wherein the first image has a first field of view (FOV) and a first set of quality characteristics and comprises a first plurality of regions; obtaining a second image from a second image capture device of the electronic device, wherein the second image has a second FOV and a second set of quality characteristics and comprises a second plurality of regions, wherein the second FOV comprises an overlapping portion with the first FOV and a non-overlapping portion with the first FOV, and wherein the second set of quality characteristics is different than the first set of quality characteristics; determining a guidance region from the first plurality of regions for each of the second plurality of regions; obtaining a first neural network, wherein the first neural network is configured to take: the second plurality of regions; and the determined guidance regions for each of the second plurality of regions as inputs; and then producing, with the first neural network, a third image having a third set of quality characteristics and a third FOV, wherein the third image and third set of quality characteristics comprise a result of the first neural network attempting to match the quality characteristics of each of the second plurality of regions to the quality characteristics of its corresponding guidance region from the first plurality of regions. In some embodiments, wherein the first image capture device has a higher quality (e.g., higher optical zoom level, higher spatial resolution, etc.) than the second image capture device, while the second FOV (i.e., the FOV of the image captured by the second image capture device) may have a larger FOV than the first FOV (i.e., the FOV of the image captured by the first image capture device). In some cases, the first FOV may be located within the second FOV (e.g., based on the relative positioning of the first image capture device and second image captured device within the housing or body of the electronic device in which they are mounted).

In other embodiments, the techniques may further comprise: determining a first set of features in the first image; determining a second set of features in the second image; and determining, based on the first and second sets of features, a homography mapping for each of the second plurality of regions located in the overlapping portion with a corresponding region from the first plurality of regions. In some such embodiments, the process of determining a guidance region for each of the second plurality of regions further comprises determining a guidance region from the first plurality of regions for each of the second plurality of regions located in the overlapping portion based, at least in part, on the determined homography mappings. In still other such embodiments, the techniques may further comprise determining a semantic mapping for each of the second plurality of regions located in the non-overlapping portion to a corresponding region from the second plurality of regions located in the overlapping portion and then determining a guidance region from the first plurality of regions for each of the second plurality of regions located in the non-overlapping portion based, at least in part, on the semantic mappings and the homography mappings (i.e., the homography mappings previously determined for the regions of the second plurality of regions that are located in the overlapping portion).

In still other embodiments, determining a guidance region from the first plurality of regions for each of the second plurality of regions further comprises performing at least one of: feature-based registration and/or alignment between pixels in the second plurality of regions located in the overlapping portion and pixels in the first plurality of regions; or semantic feature matching between pixels in the second plurality of regions located in the overlapping portion and pixels in the second plurality of regions located in the non-overlapping portion.

In yet other embodiments, the first neural network attempting to match the quality characteristics of each of the second plurality of regions to the quality characteristics of its corresponding guidance region from the first plurality of regions further comprises the first neural network: performing a feature aggregation technique on pixels from each of the second plurality of regions according to a blending map determined by the first neural network. In some such embodiments, the determined blending map may comprise values for one or more pixels corresponding to an enhanced output image, wherein the values of the pixels in the blending map (e.g., values falling in the continuous range [0, 1]) may determine the relative contributions of the corresponding LR features and HR features to the enhanced output image at the location of such pixels.

Various non-transitory computer readable media embodiments are disclosed herein. Such computer readable media are readable by one or more processors. Instructions may be stored on the computer readable media for causing the one or ore processors to perform any of the techniques disclosed herein.

Various programmable electronic devices are also disclosed herein, in accordance with the program storage device embodiments enumerated above. Such electronic devices may include one or more image capture devices, such as optical image sensors/camera units, a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

Figure 1:
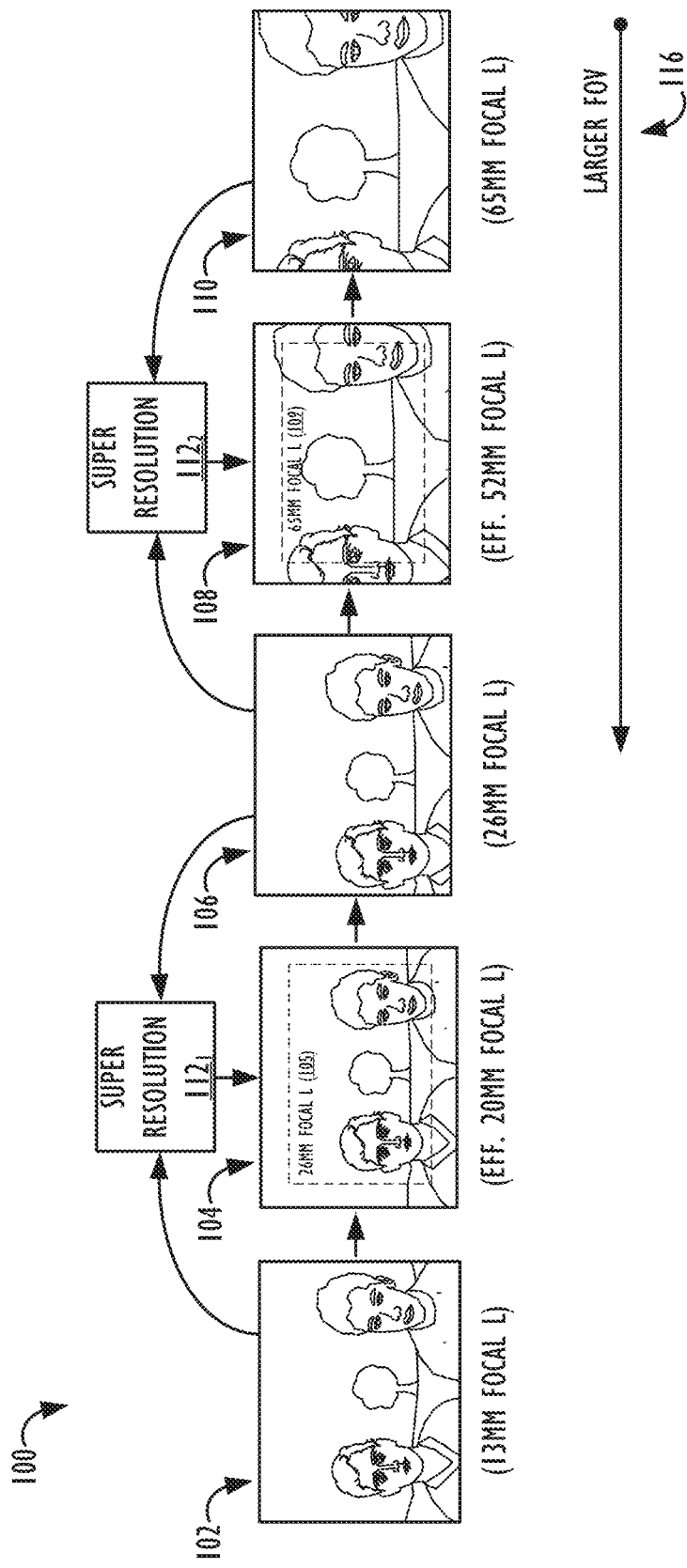
FIG. 1 illustrates exemplary image enhancement operations, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Problem Background

As described above, it can be difficult for image processing systems to bridge the gap in the perceptual quality between input images captured by image capture devices having different quality characteristics, e.g., in terms of matching spatial resolution, sharpness, texture details, and noise patterns, and achieve high quality seamless appearance in enhanced output images formed from input images captured using two or more different image capture devices. Thus, reference-based image super-resolution (RefSR) techniques are introduced herein for producing, with a first neural network employing robust feature aggregation techniques (e.g., techniques that are able to blend between single-image enhancement methods and feature aggregation methods on portions of the input image, when appropriate), an enhanced output image that attempts to match the quality characteristics of each of region in a lower quality (e.g., shorter focal length, larger field of view (FOV)) input image with the quality characteristics of the region's determined "guidance region" from at least a second, i.e., higher quality (e.g., longer focal length, smaller FOV) input image.

Some of the problems that RefSR solves are: 1) how to find the most relevant higher quality guidance regions/sets of features to constrain the super-resolution (SR) neural network; and 2) how to use/fuse the features found in these higher quality guidance regions. Typical SR methods may resort to performing dense registration (or optical flow) operations between low-resolution input images (or image regions) and high-quality guidance images (or image regions) to find correspondences, and then apply warping and/or image fusion—either in image space or deep feature space—to perform the image enhancement. These types of approaches generally generate high quality results when dense registration succeeds. However, they inevitably introduce inconsistent results for regions without matched guidance (e.g., because of occlusion or field-of-view differences), and they may introduce ghosting artifacts for regions with dense registration errors.

According to embodiments disclosed herein, the lower resolution image may be divided into a plurality of regions (through a process also referred to as "patchification," i.e., dividing the input image into a set of non-overlapping or partially-overlapping "patches" covering the entire input image), so that correspondences in deep feature space may be explored by a neural network with regions of a higher resolution image—without explicit dense registration, thus allowing the generation of consistent and high quality output image results—and with limited ghosting artifacts.

Turning now to FIG. 1, exemplary image enhancement operations 100 are illustrated, according to one or more embodiments. In the example of FIG. 1, an electronic device may have three distinct image capture devices, e.g., a "SuperWide" camera, a "Wide" camera, and a "Tele" camera that were used to produce the images 102/106/110 in FIG. 1, although this number and combination of types of image capture devices is not limiting, and is presented merely for illustrative purposes.

Image 102 represents an input image captured from a "SuperWide" FOV camera (which may be referred to herein as an example of a "low resolution" or "LR" or "lower quality" image, e.g., lower quality with respect to image 106 when digitally zoomed towards image 106's FOV). In this example, image 102 may come from a camera having an exemplary focal length of 13 mm and may be defined as having a 0.5× zoom level, i.e., the image capture device that generated image 102 is zoomed out 2×, with respect to the device's "default" image capture device.

Image 106 represents an input image captured from a "Wide" FOV camera (which may also be referred to herein as another example of a "low resolution" or "LR" or "lower quality" image, e.g., lower quality with respect to image 110 when digitally zoomed towards image 110's FOV). In this example, image 106 may come from a camera having an exemplary focal length of 26 m, and may be defined as having a 1.0× zoom level, i.e., the image capture device that generated image 106 may be considered to be the device's "default" image capture device.

Finally, image 110 represents an input image captured from a "Tele" FOV camera (which may be referred to herein as an example of a "high resolution" or "HR" or "higher quality" or "guidance" image, e.g., higher quality with respect to images 102/106 when digitally downscaled towards image 102 or 106's FOV), In this example, image 110 may come from a camera having an exemplary focal length of 65 mm, and may be defined as having a 2.5× zoom level, i.e., the image capture device that generated image 110 is zoomed in 2.5×, with respect to the device's "default" image capture device (in this case, the "Wide" camera that captured image 106). As may now be appreciated, arrow 116 in FIG. 1 indicates a direction of increasing field of view (FOV) in the images 110-102, moving from right to left across the page In the exemplary image enhancement operations 100, if a user wanted to generate an image 104 having an "effective" focal length of 20 mm, they could perform a super-resolution operation $112_1$, as will be described in further detail below, using the image information from both SuperWide image 102 and Wide image 106 and, in particular, generating the image 104 having a FOV somewhere in between image 102 and image 106, but with the benefit of the higher resolution and higher quality detail levels found in image 106. Dashed line 105 illustrates the FOV of the 26 mm focal length image 106 superimposed on image 104 with an effective 20 mm focal length, for illustrative purposes.

Similarly, in the exemplary image enhancement operations 100, if a user wanted to generate an image 108 having an "effective" focal length of 52 mm, they could perform a super-resolution operation $112_2$, using the image information from both Wide image 106 and Tele image 110 and, in particular, generating the image 108 having a FOV somewhere in between image 106 and image 110, but with the benefit of the higher resolution and higher quality detail levels found in image 110, Dashed line 109 illustrates the FOV of the 65 mm focal length image 110 superimposed on image 108 with an effective 52 mm focal length, for illustrative purposes.

As may be seen, images 102, 106, and 110 each capture different FOV images of the same scene, and they have both an overlapping portion and a non-overlapping portion with respect to each other, as will be discussed in further detail below. As will be explained herein, the use or leverage of image information from the narrower FOV "guidance image" in a RefSR enhancement operation is not limited to traditional image fusion techniques, wherein pixels from one image are mathematically blended with corresponding pixel(s) from another image according to a blending weight, and may instead include other methods of using or leveraging information from the narrower FOV image, such as the use of feature aggregation, i.e., injecting similar features extracted from the narrower FOV image into the wider FOV image via a neural network.

Due to the differences in optics, sensor, ISP tuning, or other factors, there may be an inherent quality gap between each of the images 102, 106, and 110 in a given imaging system embodiment. In other embodiments, however, each of the images 102, 106, and 110 may have similar (or nearly identical) quality characteristics at native sensor resolution. However, an observable quality gap usually appears between a "digitally zoomed" version of image, e.g., a digitally zoomed version of image 102 to have an "effective" 20 mm focal length and an image captured by a camera with "native" 29 mm focal length optics. As described above, during typical digital zooming operations, higher quality image pixels may come from an image captured natively by a narrower FOV image capture device, which may have a longer focal length, and hence better perceived quality due to better spatial resolution, while lower quality "digitally zoomed" image pixels come from an image captured natively by a wider FOV camera, which may exhibit stronger noise, lower spatial resolution, as well as a lack of sharpness when digitally zoomed. This problem can also be generalized to camera configurations with more than three camera modules, e.g., having at least partially overlapping FOVs.

Direct image fusion attempts between any two of these different types of image sources during a digital zooming operation (e.g., image 102 and image 106 in FIG. 1) could lead to a combined output with dramatically inconsistent image quality between the inner region of the fused image (coming predominantly from the narrower FOV image) and the outer region of the fused image (coming predominantly from the wider FOV image). Thus, embodiments disclosed herein will aim to enhance the visual quality of the wider FOV, lower resolution input image, e.g., by enhancing it with (and/or directly blending it with) relevant deep feature content from the narrower image, to produce a higher resolution and higher quality image without seams or blending artifacts, e.g., as shown in the "super-resolution" images 104 and 108.

The improved mufti-sensor image processing techniques presented herein have broad applications in imaging systems, including smart phone camera systems, especially for two (or more) input images having non-overlapping regions in their FOVs and/or with very different image camera properties/quality characteristics. Such systems are capable of generating an enhanced output image with consistent image quality across the entire extent of the wider FOV image, wherein the image quality of the final output may be the same as (or close to) the highest quality of all the input image sources. Such systems may be applied directly to improve image stitching with images captured with different image capture devices, different zooming between two camera modules, and many other multi-sensor aging applications, including enhanced video capture.

Exemplary Image Processing Pipeline

Figure 2:
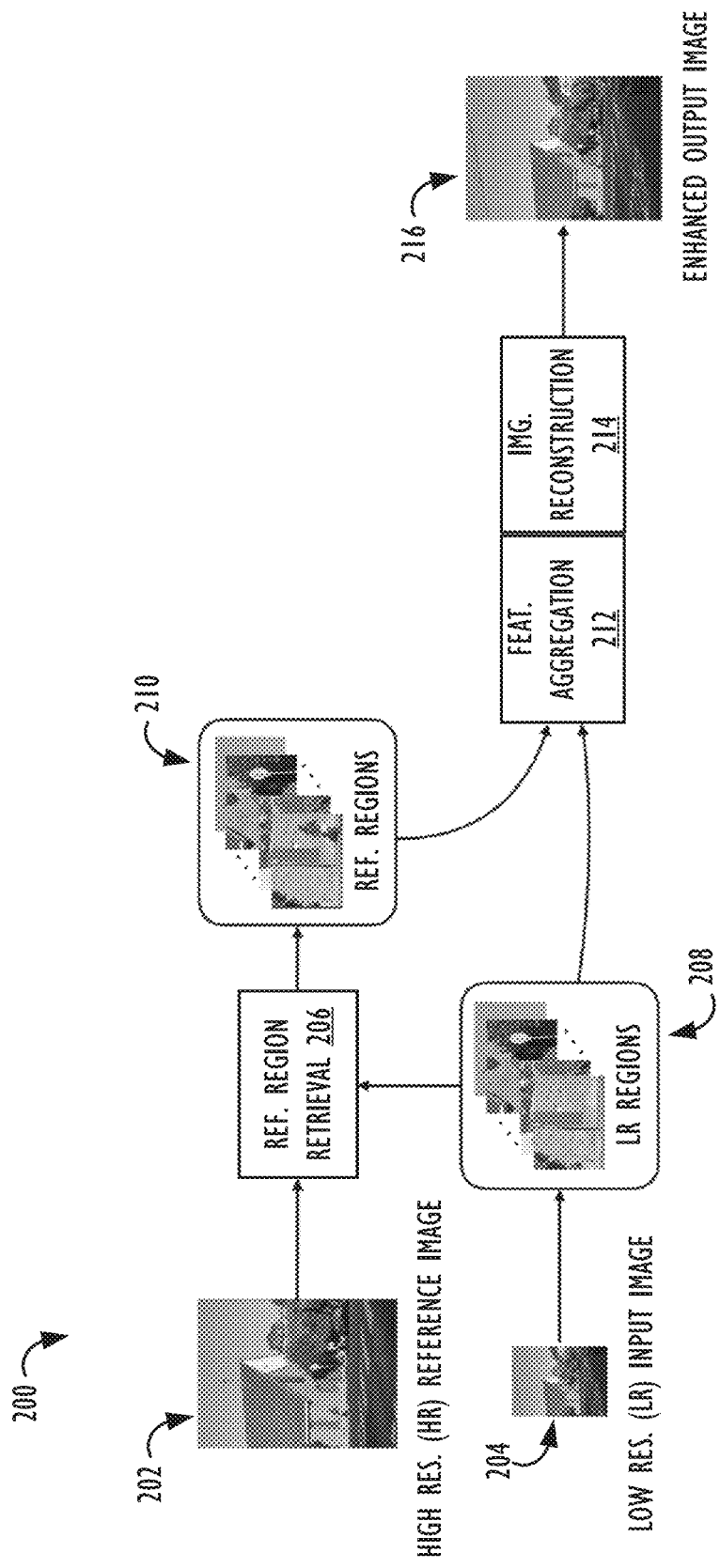
FIG. 2 illustrates an exemplary image enhancement processing pipeline, according to one or more embodiments.

Turning now to FIG. 2, an exemplary image enhancement processing pipeline 200 is illustrated, according to one or more embodiments. Pipeline 200 takes as input two images (202/204) with different spatial resolutions, captured by two cameras (preferably synchronously or near-synchronously) with different optics (e.g., focal length, lens, design, etc.) and sensors, and processed by different ISP tunings. As discussed above, as a result, these two images may differ significantly in resolution, sharpness, texture details, noise patterns, subject gestures, and tone appearance, etc.

According to some embodiments, for ease of processing, narrower FOV HR reference image 202 may be downscaled before the reference image guidance regions are retrieved at block 206. Likewise, wider FOV LR input image 204 may be upscaled and/or divided into a number of "LR regions" 208 before being processed by the RefSR deep neural network at blocks 212/214. One reason the wider FOV image 204 may need to be upscaled is to maintain a fixed resolution output image. For example, if the wider FOV image 204 is at a zoom level of 1×, and the narrower FOV image 202 is at a zoom level of 2× then, then, in order to achieve an effective zoom level of 1.5× in the output image, the correct portion of the wider FOV image 204 may be cropped out and then upscaled to match the desired resolution level.

In a first part of pipeline 200, the pipeline 200 may perform a "patchification" operation on the input wider FOV image 204 to generate LR regions 208. The pipeline 200 may also identify a plurality of regions 210 (also referred to herein as "guidance regions") from HR reference image 202 to be extracted by reference region retrieval block 206. Block 206 takes both the HR reference image 202 and the generated LR regions 208 as inputs. The process of generating a guidance region for a given LR region occurring in the overlapping portion of the LR image's FOV may comprise: 1.) estimating a homography between the LR patch and the HR reference image; 2.) warping the HR reference image according to the estimated homography; and 3.) extracting the guidance region from the warped HR reference. This process may then be applied for each of the LR image patches in the overlapping portion of the LR image's FOV to generate a set of guidance regions from the HR reference image, shown at 210. Then, using a neural network (and as will be explained in greater detail below), a robust feature aggregation operation may be performed at block 212, which may be configured to find and aggregate feature correspondences in the HR guidance regions for every location in a corresponding LR region 208, and prevent (or reduce the amount of) feature aggregation for similar yet irrelevant correspondences between LR regions and features in the corresponding HR guidance regions, in order to help eliminate ghosting artifacts. Finally, each of the enhanced LR regions (e.g., enhanced via the aforementioned feature aggregation processes) may be combined at image reconstruction block 214, resulting in the enhanced output image 216.

Exemplary Semantic Region Matching Operations

Figure 3:
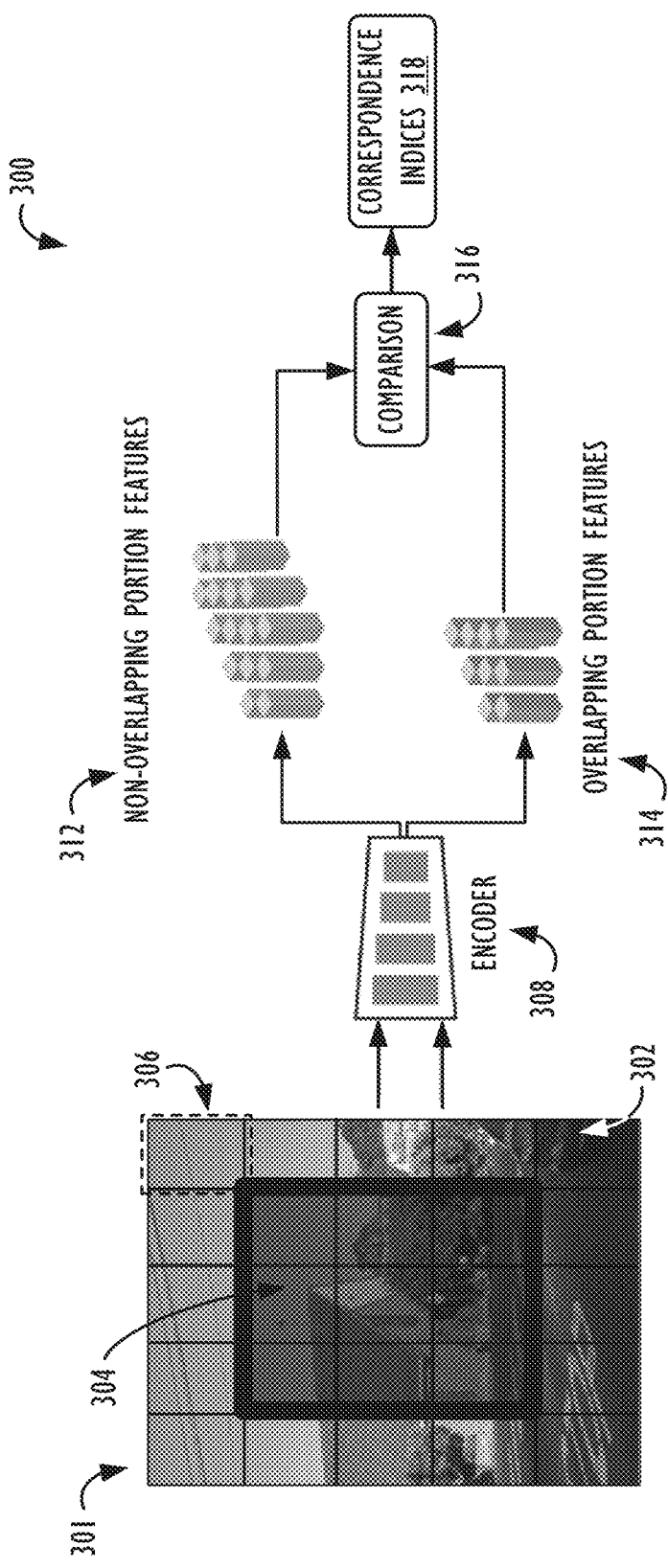
FIG. 3 illustrates an exemplary semantic region matching operation, according to one or more embodiments.

Referring now to FIG. 3, an exemplary semantic region matching operation 300 is shown, according to one or more embodiments. Example low resolution (LR) input image 301 is shown as being divided into a plurality of regions 306. In this case, image 301 is divided into 5 rows and 5 columns of regions, for 25 regions, though this number of regions is purely illustrative. In the example of FIG. 3, the more darkly-shaded region 304, comprising the 9 central regions, represents the overlapping portion of LR input image 301 with the corresponding high resolution (HR) reference image (not pictured in FIG. 3, but shown and discussed above as image 202 in FIG. 2), while the peripheral regions 302, comprising the 16 peripheral regions, represents the non-overlapping portion of LR input image 301 with its corresponding HR reference image. In other words, the actual content appearing in the peripheral regions 302 (e.g., the car in the lower right corner of LR input image 301) does not appear anywhere in the HR reference image. Thus, as will be explained in greater detail below, the techniques described herein will look for semantically similar regions in the overlapping portion of the LR input image in order to determine a guidance region from the HR reference image for peripheral/non-overlapping regions of the LR input image since, again, the actual content fro the peripheral/non-overlapping regions of the LR input image does not appear anywhere in the HR reference image in this example.

FIG. 3 shows one possible implementation of a semantic matching network for determining matches between regions in the peripheral region 302 of LR input image 301 and regions in the central region 304 of LR input image 301. In this implementation, an encoder 308 for semantic feature representation could be a typical ResNet50 network (or any other encoder network), and it could output a 2048×1×1 vector (or any desired vector size) for each input region. Then, a set of non-overlapping portion features 312 may be extracted for each region in the peripheral region 302 of LR input image 301, while a set of overlapping portion features 314 may be extracted for each region in the central region 304 of LR input image 301. Next, a comparison operation 316 (e.g., a brute-force search operation or other guided search operation) may be used to find each region in the non-overlapping portion of the LR input image 301's most semantically similar portion in the overlapping portion of the LR input image 301, The results of the semantic matching operation may then be stored, e.g., in the form of correspondence indices 318, such that it may quickly and easily be determined which regions in the non-overlapping portion most closely match which region in the overlapping portion. As will be explained in greater detail below, each region in the overlapping portion should have a homographic mapping to the corresponding region in the HR reference image, and that is the region that may be used as the "guidance region" for a given region in the non-overlapping portion of the LR input image.

Exemplary Reference Image Guidance Region Determination Operations

Figure 4:
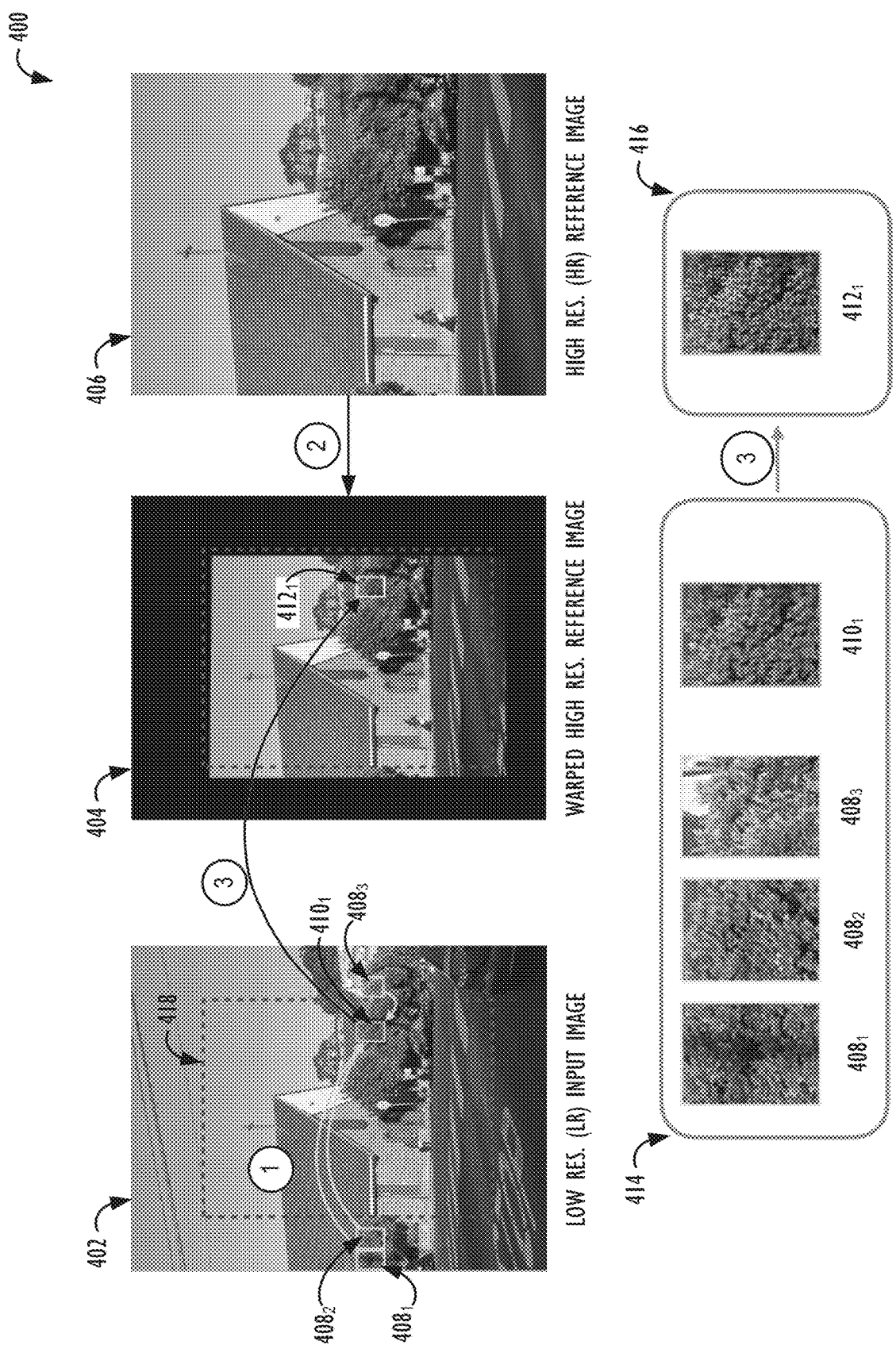
FIG. 4 illustrates exemplary reference image guidance region determination techniques, according to one or more embodiments.

Referring now to FIG. 4, exemplary reference image guidance region determination techniques 400 are shown, according to one or more embodiments. In FIG. 4, the inputs to an image enhancement operation comprise LR input image 402 and HR reference image 406. As part of a pre-processing operation, the HR reference image 406 may be warped to align with the corresponding content of LR input image 402, as shown in warped HR reference image 404 (as also indicated by the arrow labeled with a '2' in a circle), In particular, in some embodiments, for each region or patch in the overlapping portion of the LR input image (e.g., the nine regions in the central region 304 of LR input image 301, as shown in FIG. 3), a different homography transformation may be estimated between each of the regions within the overlapping portion and the HR reference image 406. So, in the examples illustrated in FIGS. 3 and 4, nine homography estimates in total may be made, with the aforementioned warping, alignment and guidance region extraction process carried out nine separate times. For this region, the warped HR reference image 404 may not be exactly the same as the dashed FOV boundary box 418 shown within LR input image 402.

According to some embodiments, each region in the non-overlapping portion of LR input image 402 may be semantically matched with the most similar region in the overlapping portion of LR input image 402 (e.g., as described above with reference to FIG. 3). In this example, each of non-overlapping portion regions $408_1$, $408_2$, and $408_3$ have semantically matched to overlapping portion $410_1$ (as also indicated by the arrows labeled with a '1' in a circle). In this example, as shown in greater detail in block 414, this appears to be because each of the regions $408_1$, $408_2$, and $408_3$ contains tree branches and leaves with similar textures and details, as does region $410_1$ in the overlapping portion.

According to some embodiments, each region in the overlapping portion of LR input image 402 may be analyzed to determine a homographic mapping to the region having the corresponding content in warped HR reference image 404. In this case, region $410_1$ corresponds to region $412_1$ in warped HR reference image 404. Thus, as shown in greater detail in block 416 (and as also indicated by the arrows labeled with a '3' in a circle), by the transitive property, each of regions $408_1$, $408_2$, $408_3$, and $410_1$ may use region $412_1$ as their guidance region from the warped HR reference image 404, i.e., as the region from which higher resolution features may be aggregated by the neural network to improve the quality of regions $408_1$, $408_2$, $408_3$, and $410_1$ in the enhanced output image. In other words, region $410_1$ maps directly to region $412_1$ via homography, while each of regions $408_1$, $408_2$, and $408_3$ maps indirectly to region $412_1$ (i.e., via their semantic matching to 'intervening' region $410_1$).

Exemplary RefSR Neural Network Architectures

Figure 5:
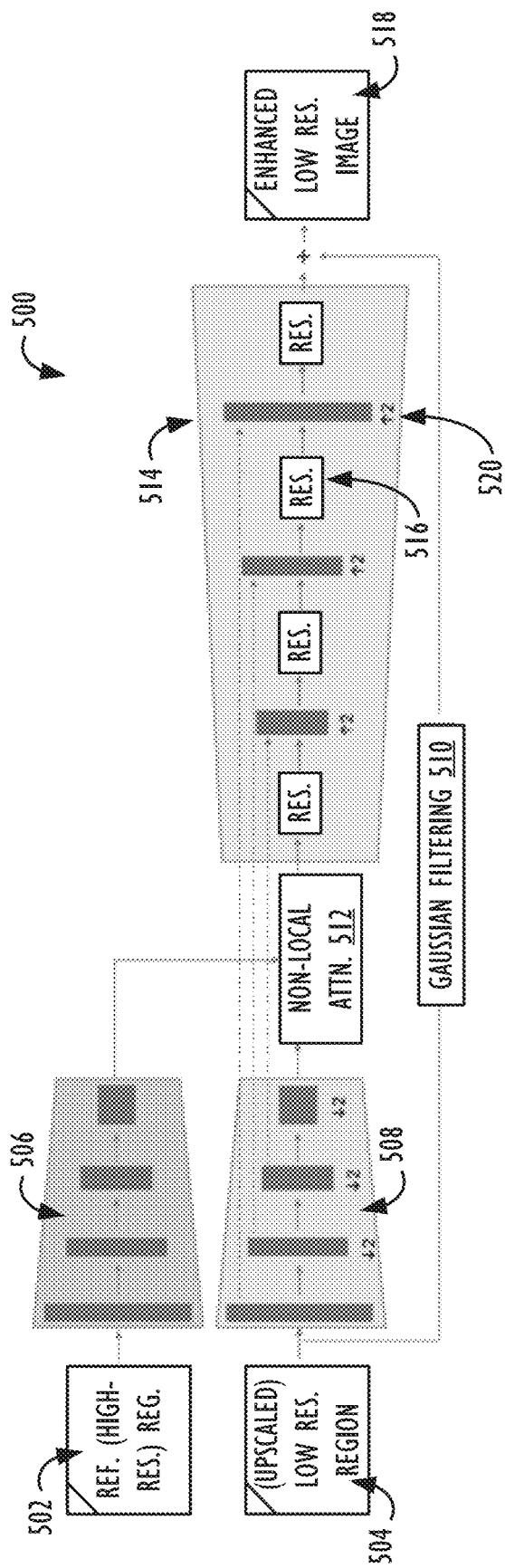
FIG. 5 illustrates an exemplary neural network architecture for performing reference-based image super-resolution image processing techniques, according to one or more embodiments.

Referring now to FIG. 5, an exemplary neural network architecture 500 for performing reference-based image super-resolution (RefSR) image processing techniques is shown, according to one or more embodiments. Given an LR input image region 504 (e.g., bi-linearly upscaled to match its size to the size of reference image region) and its corresponding HR reference image region 502 (which could, alternatively, be downscaled to match the size of the LR input image, depending on the FOV requirements for the enhanced output image), e.g., each with a size of H×W×3, two distinct encoders (506/508) firstly embed them into intermediate feature maps. In some implementations, the encoders (506/508) may consist of a set of initial convolution layers with a stride of 1 to extract low-level features from the input region. The following three subsequent convolution layers with a stride of 2 aim to transform the low-level features to more abstract latent space by inflating the number of channels and enlarging the receptive field via downscaling them to feature maps, e.g., of size (H/8)×(W/8)×(C×8).

The feature maps may then be processed by non-local attention module 512, which may be additionally configured to be performed along with feature aggregation, i.e., in order to transfer rich/high quality textures and details from the HR region 502's features into the LR region 504's corresponding features. According to some embodiments, the feature aggregation module in the network may comprise: 1) a standard non-local attention module to find and aggregate feature correspondences between HR region 502 and LR region 504; and 2) a robust aggregation procedure to recognize similar yet irrelevant correspondences and prevent feature aggregation for the irrelevant correspondences, so as to reduce or eliminate ghosting artifacts, as will be described in more detail below with reference to FIG. 6.

The enhanced (e.g., feature-aggregated) image data may then be sent into a decoder 514. In some implementations, decoder 514 may comprise four group of processing blocks. Each of the first three decoder blocks sequentially connects a series of residual blocks 516, an upsampling layer 520 (e.g., with scale factor of 2), and a concatenation operation on features in the decoder and their counterparts in the encoder passed through skip connections. The last residual block in the decoder 514 may map the features into an enhanced output residual image 518 containing the recovered details. The enhanced output residual image 518 may then ultimately be added back to the LR input image region 504 (e.g., after any desired filtering, such as represented by Gaussian filtering block 510), in order to reconstruct the desired HR output.

Non-Local Attention Module

Given the sets of features collected from the encoders 506/508, a standard non-local attention module 512 may be employed to find the feature correspondences and provide a single HR feature for each location in the LR feature set, To localize the correspondences, an outer product may be used to calculate cross-correlations for all pairs of locations between the HR feature set and the LR feature set, resulting in an affinity map, A, of size hw×hw, where h and w equal H/8 and W/8, respectively. For every location in the LR feature set, a softmax function may be applied to the corresponding row in A to convert the correlation values into similarity scores. Afterwards, a weighted averaging step fuses the HR features based on the similarity scores to achieve a single HR feature for every location in the LR feature set. The non-local attention module 512 can be implemented efficiently, e.g., via matrix multiplications, to form an aggregated HR feature map, denoted by R' (see, e.g., element 614 in FIG. 6). The enhanced LR features may then be obtained by adding the enhanced features back to the original LR image features via skip connections.

In some embodiments, it may be optimal to place the non-local attention module 512 directly after the encoders 506/508, also sometimes referred to as the "bottleneck stage" of the neural network. At this stage, the receptive field of the network is adequately wide, such that it provides sufficient context for texture comparisons across LR and HR domains. Furthermore, since both the LR features and HR features undergo similar architectural paths, they tend to be roughly in a similar representational distribution and hence the correspondence matching can be more accurate. In contrast, moving the non-local attention module 512 into other scales would inevitably increase chances of mismatches, e.g., due to larger quality gap HR and LR features at the larger spatial resolution stages. In other words, if the features were compared at the input LR image resolution (i.e., without any pooling), features from HR reference image would contain many high-frequency details, which would be significantly different from the low resolution/blurrier features present in the LR image. Performing the non-local attention in the bottleneck stage may also contribute to less computational load in the overall system.

Exemplary Blending Map Modules for Robust Feature Aggregation Operations

Based on experimentation, it has been determined that a naïve summation of all LR features and corresponding best-matching HR features could result in severe ghosting artifacts, e.g., especially when the relevant features for a subset of locations in the LR feature set do not actually exist in the HR feature set (e.g., they may come from the non-overlapping portion of the FOV).

To address this issue, according to some embodiments disclosed herein, the network's feature aggregation module may be improved by allowing the network to identify the regions in the LR feature set that would result in potential ghosting artifacts if they were enhanced by the best-matching HR feature and instead revert back to single image enhancement techniques (e.g., SISR) or "hybrid" feature aggregation techniques (wherein the decoder/image reconstruction module could still propagate some "enhanced" HR features from neighboring regions in the image to those regions that do not themselves have relevant HR features matches, e.g., according to a blending map determined by the network to balance the impact of the LR features and HR features) for such regions. In this way, the network can discard (or decrease the impact of) the irrelevant features from the feature aggregation process and perform aggregation for regions using relevant matching HR features only to the extent determined by the network.

Figure 6:
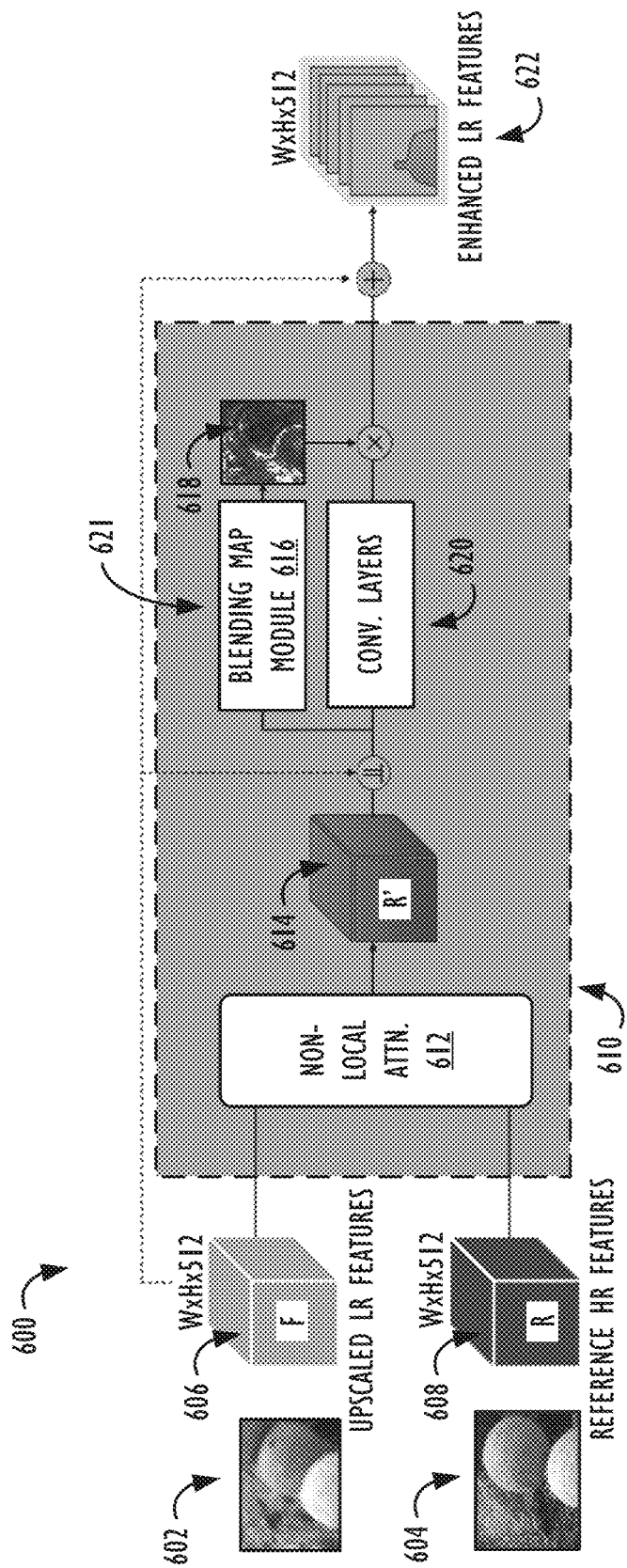
FIG. 6 illustrates an exemplary blending map module, according to one or more embodiments.

Referring now to FIG. 6, an exemplary neural network 600 comprising a robust aggregation module 610 is shown, according to one or more embodiments. As shown in FIG. 6, the robust aggregation module 610 may consist of two parallel branches: 1) a first branch (620) utilizes two consecutive convolution layers to processes features from the concatenation of R' 614 (i.e., non-local attention features) and the (optionally upscaled) LR features 606; and 2) a second branch (621) that comprises a blending map module 616, which is used to produce an explicit blending map 618, which is used to gate the contribution of irrelevant and relevant HR features.

For example, in some embodiments, the HR features may be aggregated for pixels from the LR images that match a pixel in a corresponding guidance region from the HR image with greater than or equal to a threshold confidence level, and single-image enhancement techniques may be applied for pixels from the LR images that do not r patch a pixel in a corresponding guidance region from the HR image with greater than or equal to the threshold confidence level.

In other embodiments, rather than using a threshold confidence level to drive the determination of whether to apply exclusively feature aggregation techniques or single-image enhancement techniques, the neural network may instead utilize the feature aggregation blending map module 616 to estimate a robust blending weight mask, e.g., with floating values ranging between [0, 1] for each pixel, meaning that a per-pixel blending or combination operation is performed based on the corresponding value in the blending weight mask.

In particular, the value in the blending weight mask module may control the degree of blending in the output image between features from the lower resolution image regions and the aggregated features created from both the lower resolution image regions and the corresponding higher resolution guidance regions. In some such cases, even for output image pixels that do not get aggregated (i.e., higher resolution) features, the decoder/image reconstruction portion of the neural network can learn and propagate higher resolution guidance region properties from neighboring pixels that do have aggregated higher resolution features to the pixel locations that do not have aggregated features. As a result, the neural network can still generate enhanced pixels better with a higher quality level than traditional SISR techniques. This also results in more consistent image quality across the entire extent of the wider FOV image.

As described above, the non-local attention module 612 may produce an aggregated HR feature map, denoted by R' (614), The regions for which HR features are eliminated via the blending map 618 may instead be filled with original features from the (optionally upscaled) LR features 606, e.g., using a skip connection, resulting in the output enhanced LR features 622, which may each comprise a combination of HR features and LR features (e.g., as indicated by the differently-shaded regions in 622), according to the values in blending map 618.

Exemplary Image Processing Operations

Figure 7A:
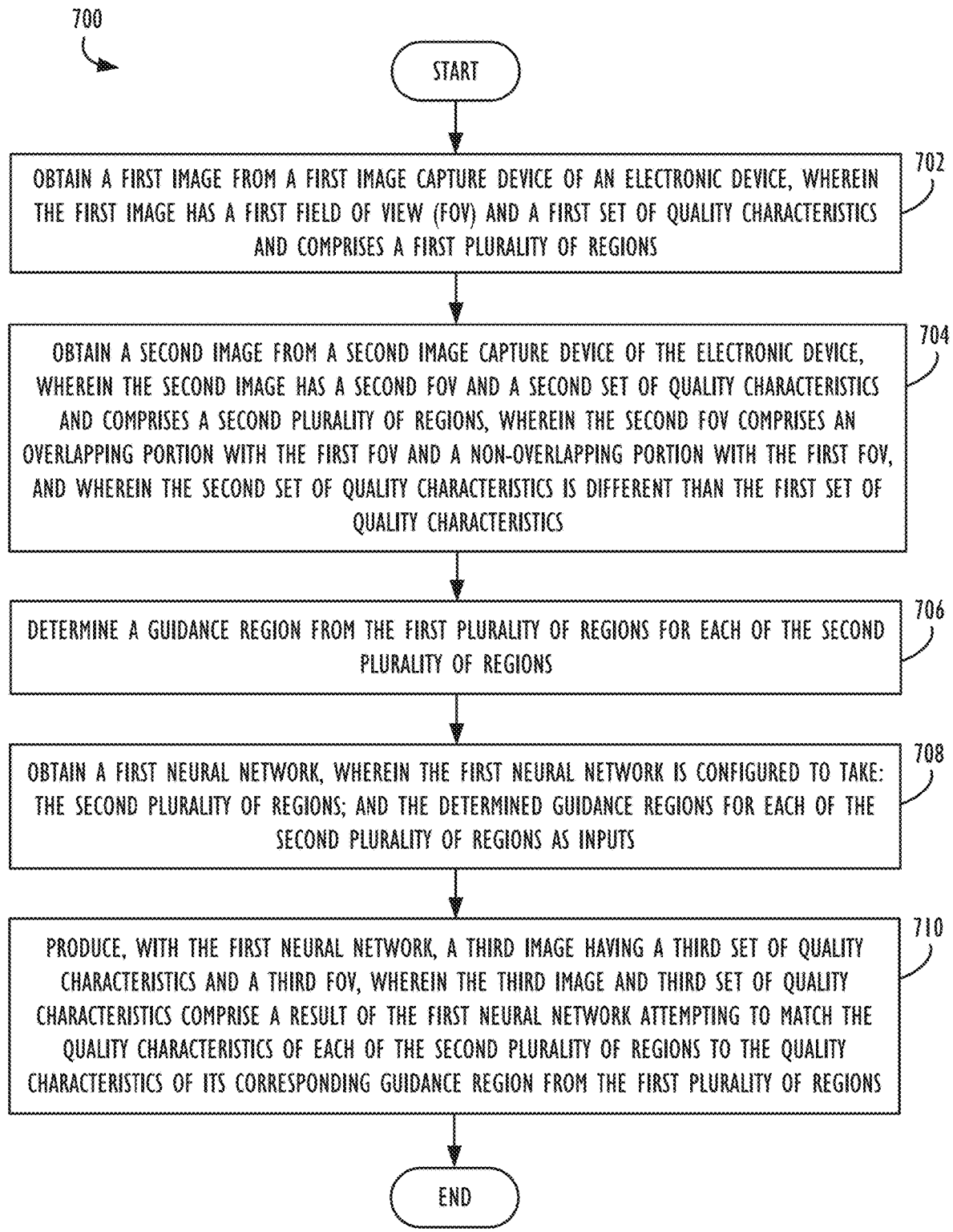
FIGS. 7A-7B are flow charts illustrating various methods of performing reference-based image super-resolution (RefSR) image processing techniques for image and/or video enhancement, according to one or more embodiments.

Referring now to FIG. 7A, a flow chart illustrating a method 700 of performing reference-based image super-resolution image processing techniques for image and/or video enhancement is shown, in accordance with one or more embodiments. First, at Step 702, the method 700 may obtain a first image from a first image capture device of an electronic device, wherein the first image has a first field of view (FOV) and a first set of quality characteristics and comprises a first plurality of regions. Next, at Step 704, the method 700 may obtain a second image from a second image capture device of the electronic device, wherein the second image has a second FOV and a second set of quality characteristics and comprises a second plurality of regions, wherein the second FOV comprises an overlapping portion with the first FOV and a non-overlapping portion with the first FOV, and wherein the second set of quality characteristics is different than the first set of quality characteristics.

Next, at Step 706, the method 700 may determine a guidance region from the first plurality of regions for each of the second plurality of regions. For example, in some embodiments, a guidance region for each region from a lower-quality (but larger FOV) second image may be determined from within a higher-quality (but smaller FOV) first image. As described above, in some embodiments, the guidance region identified from the first plurality of regions may be based on a homographic operation (e.g., a pixel matching-based warping operation, to register/align regions in the second image's larger FOV with matching regions that are also within the first image's smaller FOV) or a semantic mapping operation (e.g., a deep feature r patching operation, for regions in the second image's larger FOV that are not captured within the first image's smaller FOV).

Next, at Step 708, the method 700 may obtain a first neural network, wherein the first neural network is configured to take: the second plurality of regions; and the determined guidance regions for each of the second plurality of regions as inputs. Finally, as described in detail above, at Step 710, the method 700 may use the first neural network to produce a third image having a third set of quality characteristics and a third FOV, wherein the third image and third set of quality characteristics comprise a result of the first neural network attempting to match the quality characteristics of each of the second plurality of regions to the quality characteristics of its corresponding guidance region from the first plurality of regions. In some embodiments, the third FOV may be the same as the second FOV, but this is not strictly necessary.

In some instances, the neural network may attempt to match the quality characteristics of a region from the second plurality of regions to its corresponding guidance region from the first plurality of regions according to the aforementioned feature aggregation techniques. As described above with reference to FIG. 6, according to some embodiments, the values determined by a blending map module of the neural network are used to produce a blending map for the image, which blending map may comprise weight values, at each pixel location, specifying the amount of impact that the HR features from the corresponding guidance region will have on the enhanced output it cage at a particular pixel location (e.g., if the blending map value for a pixel is 0, on a normalized scale of [0, 1], the features from the corresponding guidance region may be given no impact in the enhanced output image generation, while, if the blending map value for a pixel is 1, the features from the corresponding guidance region may be given full impact in the enhanced output image generation).

Figure 7B:
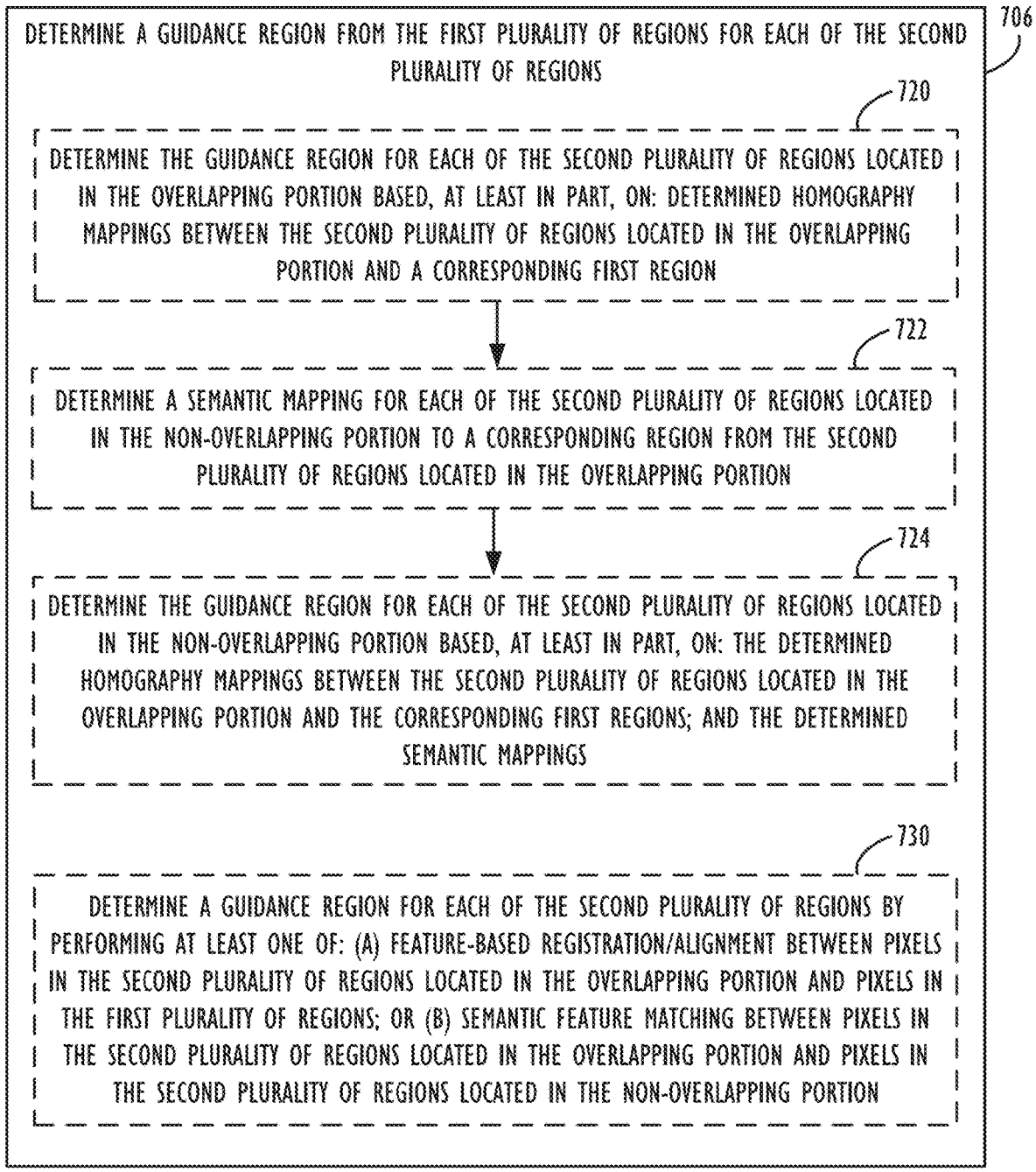

Turning now to FIG. 7B, a flow chart illustrating additional details to Step 706 of method 700 is shown, in accordance with one or more embodiments. According to one embodiment (e.g., as described above primarily with reference to FIG. 4), at Step 720, the guidance region for each of the second plurality of regions located in the overlapping portion may be determine based, at least in part, on: determined homography mappings between the second plurality of regions located in the overlapping portion and a corresponding first region. In other words, because the pixels in the overlapping portion of the second image should find a strong match with a set of corresponding pixels in the first image, homography mappings may be used (e.g., on a region-by-region basis) to determine the best guidance region for each of the second plurality of regions located in the overlapping portion. Further, at Step 722, a semantic mapping may be determined for each of the second plurality of regions located in the non-overlapping portion to a corresponding region from the second plurality of regions located in the overlapping portion. As described above (again, primarily with reference to FIG. 4), because the content located in the second plurality of regions located in the non-overlapping portion is not represented at all in the first image, it will not be possible to find a homographic mapping to a guidance region in the first image for such regions from the non-overlapping portion of the second image. Thus, instead, at Step 722, semantic mapping may be used to find a region in the overlapping portion of the second image containing the most similar features (e.g. from a deep feature matching standpoint) to the features in each region from the non-overlapping portion of the second image.

Then, at Step 724, once the semantic mappings have been determined, the guidance regions for each of the second plurality of regions located in the non-overlapping portion may be determined based, at least in part, on: the determined homography mappings between the second plurality of regions located in the overlapping portion and the corresponding first regions; and the aforementioned determined semantic mappings. In other words, once a semantic best matching region within the overlapping portion of the second image is found for each region in the non-overlapping portion of the second image, the guidance region for the region in the non-overlapping portion of the second image may be determined by "daisy chaining" over to select the guidance region in the first image that was previously determined (e.g., at Step 720) for the semantic best matching region within the overlapping portion of the second image to also serve as the guidance region for respective region from the non-overlapping portion of the second image.

According to another embodiment (e.g., as described above primarily with reference to FIG. 4), at Step 730, the guidance region for each of the second plurality of regions may be determined by performing at least one of: (a) feature-based registration/alignment between pixels in the second plurality of regions located in the overlapping portion and pixels in the first plurality of regions; or (b) semantic feature matching between pixels in the second plurality of regions located in the overlapping portion and pixels in the second plurality of regions located in the non-overlapping portion The techniques of method 700 may provide the following illustrative benefits for multi-sensor image super-resolution/enhancement techniques: (1) the ability to enhance and hallucinate appropriate image texture details to bridge the image quality gap between images captured by differing image capture devices; (2) the ability to create higher quality output images at "effective focal lengths" that an image capture device would not otherwise be able to create; and (3) improvements in local tone-mapping (LTM) and detail preservation in the enhanced output images.

In some embodiments, the RefSR techniques described herein could also be used in a video super-resolution pipeline. For example, RefSR techniques could be used to super-resolve a low resolution video stream using intermittently spaced high quality guidance images to generate high quality high resolution video output. For example, RefSR techniques could super-resolve a 720p video stream with high quality guidance images (e.g., which could be 4K image frames or other resolutions) interspersed every X frames (e.g., every 10 frames) to generate a 4K video output stream with high quality realistic texture details. The high quality guidance images could be images captured from a high-end camera at a different time, or even downloaded from Internet, etc.

In still other embodiments, the RefSR techniques could be employed in the use of a new video format, e.g., a hybrid dynamic video format. For example, in some instances, every X frames, the camera could capture a higher resolution image frame, and then capture the intervening X-1 images frames at a lower resolution, Using the captured high-resolution frames, the RefSR techniques described herein could reconstruct the entire high-resolution video output with realistic high quality details. This new video format could dramatically reduce required content storage space and required network bandwidth for content transmission.

Exemplary Electronic Computing Devices

Figure 8:
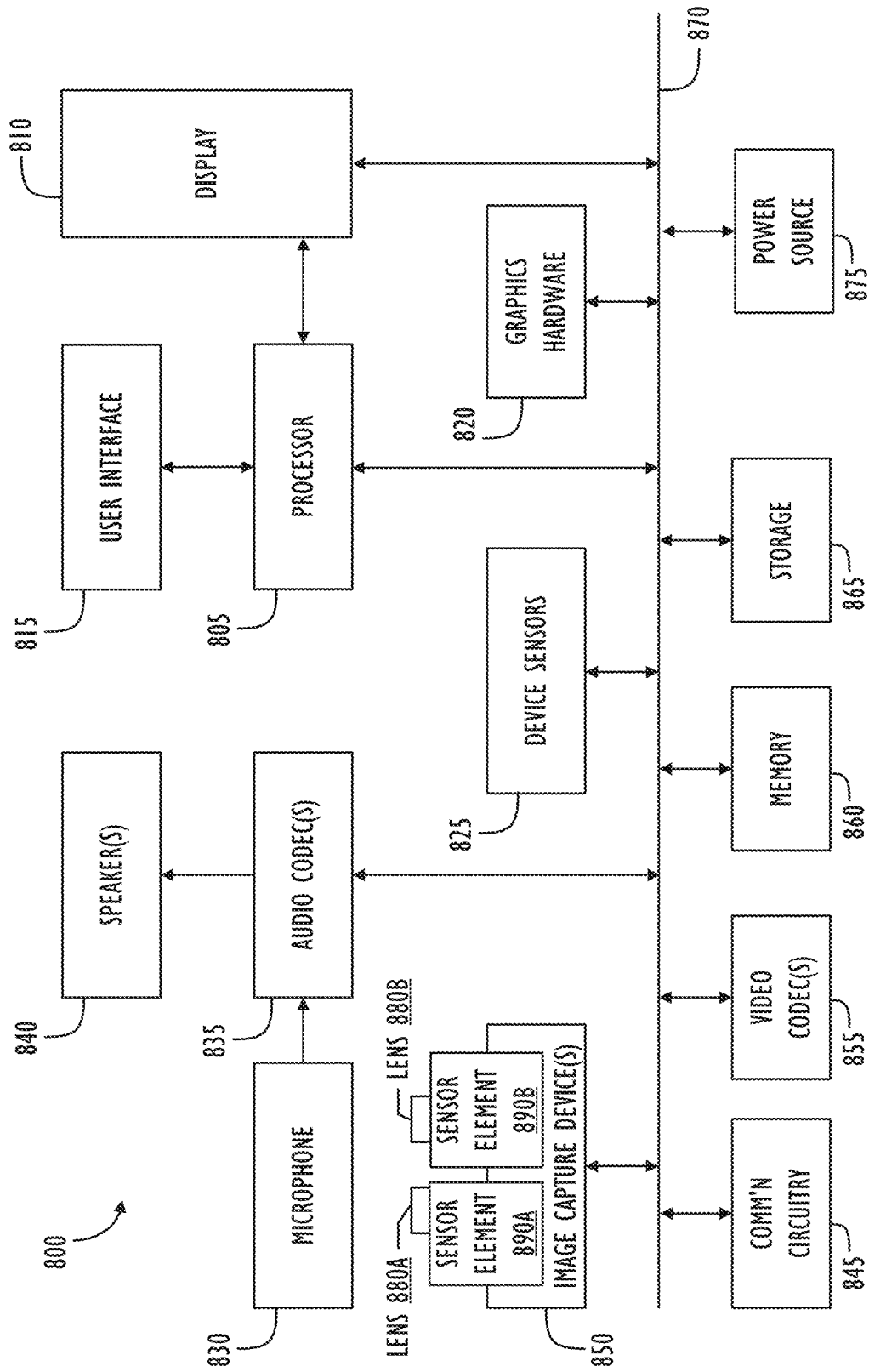
FIG. 8 is a block diagram illustrating a programmable electronic computing device, in which one or more of the techniques disclosed herein may be implemented.

Referring now to FIG. 8, a simplified functional block diagram of illustrative programmable electronic computing device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer, inertial measurement unit, and/or gyroscope), microphone 830, audio codec(s) 835, speaker(s) 840, communications circuitry 845, image capture device(s) 850, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 855, memory 860, storage 865, and communications bus 870.

Processor 805 may execute instructions necessary to carry out or control the operation of many functions performed by electronic device 800 (e.g., such as the generation and/or processing of images in accordance with the various embodiments described herein). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 810 may display a video stream as it is captured while processor 805 and/or graphics hardware 820 and/or image capture circuitry contemporaneously generate and store the video stream in memory 860 and/or storage 865. Processor 805 may be a system-on-chip (SOC) such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 850 may comprise one or more camera units configured to capture images, e.g., images which may be processed to generate enhanced versions of said captured images, e.g., in accordance with this disclosure. Image capture device(s) 850 may include two (or more) lens assemblies 880A and 880B, where each lens assembly may have a separate focal length. For example, lens assembly 880A may have a shorter focal length relative to the focal length of lens assembly 880B. Each lens assembly may have a separate associated sensor element, e.g., sensor elements 890A/890B. Alternatively, two or more lens assemblies may share a common sensor element. Image capture device(s) 850 may capture still and/or video images, Output from image capture device(s) 850 may be processed, at least in part, by video codec(s) 855 and/or processor 805 and/or graphics hardware 820, and/or a dedicated image processing unit or image signal processor incorporated within image capture device(s) 850. Images so captured may be stored in memory 860 and/or storage 865.

Memory 860 may include one or more different types of media used by processor 805, graphics hardware 820, and image capture device(s) 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805, such computer program code may implement one or more of the methods or processes described herein. Power source 875 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 800.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An image processing method, comprising:
   obtaining a first image from a first image capture device of an electronic device, wherein the first image has a first field of view (FOV) and a first set of quality characteristics and comprises a first plurality of regions;
   obtaining a second image from a second image capture device of the electronic device, wherein the second image has a second FOV and a second set of quality characteristics and comprises a second plurality of regions, wherein the second FOV comprises an overlapping portion with the first FOV and a non-overlapping portion with the first FOV, and wherein the second set of quality characteristics is different than the first set of quality characteristics;
   determining a guidance region from the first plurality of regions for each of the second plurality of regions;
   obtaining a first neural network, wherein the first neural network is configured to take: the second plurality of regions; and the determined guidance regions for each of the second plurality of regions as inputs; and
   producing, with the first neural network, a third image having a third set of quality characteristics and a third FOV, wherein the third image and third set of quality characteristics comprise a result of the first neural network attempting to match the quality characteristics of each of the second plurality of regions to the quality characteristics of its corresponding guidance region from the first plurality of regions.

2. The method of claim 1, further comprising:
   determining a first set of features in the first image;
   determining a second set of features in the second image; and
   determining, based on the first and second sets of features, a homography mapping for each of the second plurality of regions located in the overlapping portion with a corresponding region from the first plurality of regions.

3. The method of claim 2, wherein determining a guidance region from the first plurality of regions for each of the second plurality of regions further comprises:
   determining a guidance region from the first plurality of regions for each of the second plurality of regions located in the overlapping portion based, at least in part, on the determined homography mappings.

4. The method of claim 3, further comprising:
   determining a semantic mapping for each of the second plurality of regions located in the non-overlapping portion to a corresponding region from the second plurality of regions located in the overlapping portion.

5. The method of claim 4, wherein determining a guidance region from the first plurality of regions for each of the second plurality of regions further comprises:
   determining a guidance region from the first plurality of regions for each of the second plurality of regions located in the non-overlapping portion based, at least in part, on the semantic mappings and the homography mappings.

6. The method of claim 1, wherein determining a guidance region from the first plurality of regions for each of the second plurality of regions further comprises performing at least one of:
   feature-based alignment between pixels in the second plurality of regions located in the overlapping portion and pixels in the first plurality of regions; or
   semantic feature matching between pixels in the second plurality of regions located in the overlapping portion and pixels in the second plurality of regions located in the non-overlapping portion.

7. The method of claim 1, wherein the first image capture device has a higher quality than the second image capture device, wherein the second FOV is larger than the first FOV, and wherein the first FOV is located within the second FOV.

8. The method of claim 1, wherein the first neural network attempting to match the quality characteristics of each of the second plurality of regions to the quality characteristics of its corresponding guidance region from the first plurality of regions further comprises the first neural network:
   performing a feature aggregation technique on pixels from each of the second plurality of regions according to a blending map determined by the first neural network.

9. A non-transitory computer readable medium comprising computer readable instructions executable by one or more processors to:
   obtain a first image from a first image capture device of an electronic device, wherein the first image has a first field of view (FOV) and a first set of quality characteristics and comprises a first plurality of regions;

obtain a second image from a second image capture device of the electronic device, wherein the second image has a second FOV and a second set of quality characteristics and comprises a second plurality of regions, wherein the second FOV comprises an overlapping portion with the first FOV and a non-overlapping portion with the first FOV, and wherein the second set of quality characteristics is different than the first set of quality characteristics;

determine a guidance region from the first plurality of regions for each of the second plurality of regions;

obtain a first neural network, wherein the first neural network is configured to take: the second plurality of regions; and the determined guidance regions for each of the second plurality of regions as inputs; and produce, with the first neural network, a third image having a third set of quality characteristics and a third FOV, wherein the third image and third set of quality characteristics comprise a result of the first neural network attempting to match the quality characteristics of each of the second plurality of regions to the quality characteristics of its corresponding guidance region from the first plurality of regions.

10. The non-transitory computer readable medium of claim 9, wherein the computer readable instructions are further executable by the one or more processors to:
 determine a first set of features in the first image;
 determine a second set of features in the second image; and
 determine, based on the first and second sets of features, a homography mapping for each of the second plurality of regions located in the overlapping portion with a corresponding region from the first plurality of regions.

11. The non-transitory computer readable medium of claim 10, wherein the instructions to determine a guidance region from the first plurality of regions for each of the second plurality of regions further comprise instructions to:
 determine a guidance region from the first plurality of regions for each of the second plurality of regions located in the overlapping portion based, at least in part, on the determined homography mappings.

12. The non-transitory computer readable medium of claim 11, wherein the computer readable instructions are further executable by the one or more processors to:
 determine a semantic mapping for each of the second plurality of regions located in the non-overlapping portion to a corresponding region from the second plurality of regions located in the overlapping portion.

13. The non-transitory computer readable medium of claim 12, wherein the instructions to determine a guidance region from the first plurality of regions for each of the second plurality of regions further comprise instructions to:
 determine a guidance region from the first plurality of regions for each of the second plurality of regions located in the non-overlapping portion based, at least in part, on the semantic mappings and the homography mappings.

14. The non-transitory computer readable medium of claim 9, wherein the instructions to determine a guidance region from the first plurality of regions for each of the second plurality of regions further comprise instructions to cause the one or more processors to:
 perform feature-based alignment between pixels in the second plurality of regions located in the overlapping portion and pixels in the first plurality of regions; or
 perform semantic feature matching between pixels in the second plurality of regions located in the overlapping portion and pixels in the second plurality of regions located in the non-overlapping portion.

15. The non-transitory computer readable medium of claim 9, wherein the first neural network attempting to match the quality characteristics of each of the second plurality of regions to the quality characteristics of its corresponding guidance region from the first plurality of regions further comprises the first neural network:
 performing a feature aggregation technique on pixels from each of the second plurality of regions according to a blending map determined by the first neural network.

16. A device, comprising
 a memory;
 a first image capture device;
 a second image capture device; and
 one or more processors operatively coupled to the memory, wherein the one or more processors are configured to execute instructions causing the one or more processors to:
  obtain a first image from the first image capture device, wherein the first image has a first field of view (FOV) and a first set of quality characteristics and comprises a first plurality of regions;
  obtain a second image from the second image capture device, wherein the second image has a second FOV and a second set of quality characteristics and comprises a second plurality of regions, wherein the second FOV comprises an overlapping portion with the first FOV and a non-overlapping portion with the first FOV, and wherein the second set of quality characteristics is different than the first set of quality characteristics;
  determine a guidance region from the first plurality of regions for each of the second plurality of regions;
  obtain a first neural network, wherein the first neural network is configured to take: the second plurality of regions; and the determined guidance regions for each of the second plurality of regions as inputs; and
  produce, with the first neural network, a third image having a third set of quality characteristics and a third FOV, wherein the third image and third set of quality characteristics comprise a result of the first neural network attempting to match the quality characteristics of each of the second plurality of regions to the quality characteristics of its corresponding guidance region from the first plurality of regions.

17. The device of claim 16, wherein the one or more processors are further configured to execute instructions causing the one or more processors to:
 determine a first set of features in the first image;
 determine a second set of features in the second image; and
 determine, based on the first and second sets of features, a homography mapping for each of the second plurality of regions located in the overlapping portion with a corresponding region from the first plurality of regions.

18. The device of claim 16, wherein the first image capture device has a higher quality than the second image capture device, wherein the second FOV is larger than the first FOV, and wherein the first FOV is located within the second FOV.

19. The device of claim 16, wherein the instructions to determine a guidance region from the first plurality of regions for each of the second plurality of regions further comprise instructions to cause the one or more processors to:

perform feature-based alignment between pixels in the second plurality of regions located in the overlapping portion and pixels in the first plurality of regions; or perform semantic feature matching between pixels in the second plurality of regions located in the overlapping portion and pixels in the second plurality of regions located in the non-overlapping portion.

20. The device of claim 16, wherein the first neural network attempting to match the quality characteristics of each of the second plurality of regions to the quality characteristics of its corresponding guidance region from the first plurality of regions further comprises the first neural network:

performing a feature aggregation technique on pixels from each of the second plurality of regions according to a blending map determined by the first neural network.

\* \* \* \* \*